United States Patent
Matsunaga (10) Patent No.: US 11,431,865 B2
(45) Date of Patent: Aug. 30, 2022

(54) SYSTEM HAVING IMAGE FORMING APPARATUS FOR FORMING AN IMAGE ON SHEET OF RECORDING MEDIUM, AND IMAGE READING APPARATUS FOR READING IMAGE ON SHEET OF RECORDING MEDIUM CONVEYED FROM IMAGE FORMING APPARATUS

(71) Applicant: CANON KABUSHIKI KAISHA, Tokyo (JP)

(72) Inventor: Keisuke Matsunaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/178,368

(22) Filed: Feb. 18, 2021

(65) Prior Publication Data

US 2021/0274057 A1 Sep. 2, 2021

(30) Foreign Application Priority Data

Feb. 27, 2020 (JP) .............................. JP2020-032032

(51) Int. Cl.
*H04N 1/00* (2006.01)

(52) U.S. Cl.
CPC ..... *H04N 1/00578* (2013.01); *H04N 1/00602* (2013.01); *H04N 1/00615* (2013.01); *H04N 1/00631* (2013.01); *H04N 1/00795* (2013.01)

(58) Field of Classification Search
CPC ........... H04N 1/00023; H04N 1/00602; H04N 1/00002; H04N 1/00015; H04N 1/00045; H04N 1/0005; H04N 1/00063; H04N 1/00068; H04N 1/00082; H04N 1/00087; H04N 1/0057; H04N 1/00588; H04N 1/00591; H04N 1/00607; H04N 1/00702; H04N 1/047; H04N 1/2307; H04N 1/2346; H04N 1/38; H04N 1/506; H04N 1/6033; H04N 2201/0082; H04N 2201/04767; H04N 1/00578; H04N 1/00615; H04N 1/00631; H04N 1/00795; H04N 1/0473;

(Continued)

(56) References Cited

U.S. PATENT DOCUMENTS 10,404,883 B2 * 9/2019 Anezaki .............. H04N 1/0057
2012/0002228 A1 * 1/2012 Sumii .................. G03G 15/238
358/1.12

(Continued)

FOREIGN PATENT DOCUMENTS

JP 2005-205687 A 8/2005
JP 2019-164033 A 9/2019

*Primary Examiner* — Negussie Worku
(74) *Attorney, Agent, or Firm* — Venable LLP (57) ABSTRACT

An image forming system includes an image forming apparatus and an image reading apparatus. The image forming apparatus includes an image forming unit, a first pair of conveying rollers and a first motor driving the first pair of conveying rollers at a first speed. The image reading apparatus includes an image reading unit, a second pair of conveying rollers arranged downstream of said first pair of conveying rollers and a second motor driving the second pair of conveying rollers at a second speed lower than the first speed. The second motor drives the second pair of conveying rollers at the second speed so as to form a loop of the sheet between the first pair of conveying rollers and the second pair of conveying rollers.

10 Claims, 7 Drawing Sheets

(58) Field of Classification Search
CPC ...... H04N 1/1135; H04N 1/12; H04N 1/4056; H04N 2201/02439; H04N 2201/0471; H04N 2201/04722; H04N 2201/04724; H04N 2201/04725; H04N 2201/04732; H04N 2201/04734; H04N 2201/04744; H04N 2201/04756; H04N 2201/04794; B41J 2/32; B41J 2/38; B41J 11/0065; B41J 11/42; B41J 13/025; B41J 13/14; B41J 23/025; B41J 2/16523; B41J 2/17596; B41J 2/2056; B41J 2/2125; B41J 2/36; B41M 5/34; B41M 2205/04; G03G 15/1685; G03G 2215/00156; G03G 2215/0016; G03G 2215/1623; G03G 15/043; G03G 15/326; G03G 15/5008; G03G 15/757; G06K 15/027; G06K 9/036; G06K 15/1219; F04B 43/1253; G01T 1/2012; G03B 42/02
USPC .......................................................... 358/498
See application file for complete search history.

(56) References Cited

U.S. PATENT DOCUMENTS

| | | | |
|---|---|---|---|
| 2012/0081763 A1* | 4/2012 | Goto | H04N 1/00583 358/498 |
| 2014/0138898 A1* | 5/2014 | Maeda | H04N 1/00588 271/3.16 |
| 2015/0274468 A1* | 10/2015 | Yamagishi | B65H 7/08 271/3.17 |
| 2016/0191733 A1* | 6/2016 | Konishi | H04N 1/00925 358/1.12 |
| 2016/0234398 A1* | 8/2016 | Itou | H04N 1/047 |
| 2016/0366295 A1* | 12/2016 | Matsumoto | B65H 7/02 |
| 2017/0050812 A1* | 2/2017 | Mukai | H04N 1/00779 |
| 2018/0173150 A1* | 6/2018 | Isohara | G03G 15/6564 |
| 2018/0262639 A1* | 9/2018 | Anezaki | H04N 1/0057 |
| 2019/0306353 A1* | 10/2019 | Ishikura | B26D 5/32 |
| 2020/0156890 A1* | 5/2020 | Takane | B65H 9/002 |
| 2020/0280648 A1* | 9/2020 | Nakano | H04N 1/00737 |
| 2020/0296243 A1* | 9/2020 | Aoyagi | H04N 1/32448 |
| 2021/0314458 A1* | 10/2021 | Sekigawa | H04N 1/00631 |
| 2021/0360116 A1* | 11/2021 | Nagata | H04N 1/00602 |

* cited by examiner

SYSTEM HAVING IMAGE FORMING APPARATUS FOR FORMING AN IMAGE ON SHEET OF RECORDING MEDIUM, AND IMAGE READING APPARATUS FOR READING IMAGE ON SHEET OF RECORDING MEDIUM CONVEYED FROM IMAGE FORMING APPARATUS

FIELD OF THE INVENTION AND RELATED ART

The present invention relates to a system which has: an image forming apparatus for forming an image on a sheet of recording medium; and an image reading apparatus for reading the image on a sheet of recording medium conveyed from the image forming apparatus.

There have been known image formation systems which have: an image forming apparatus for forming an image on a sheet of recording medium; and an image reading apparatus for reading the image on a sheet of recording medium conveyed from an image forming apparatus. In the case of these type of image formation systems, an image formed on a sheet of recording medium is read by their image reading apparatus, and the data of the read image are compared to the referential data stored in advance, to examine the image on the sheet of recording medium in quality. They are used by a method for examining an image on a sheet of recording medium in quality. More specifically, after an image is formed on a sheet of recording medium, the sheet is conveyed to the image reading portion of the system, in which the image on the sheet is read by its image reading portion while being conveyed through the image reading portion. Further, the system is structured so that it is switchable in the portions of the system, into which sheets are to be discharged, based on the result of examination, in order to ensure that only the sheets with an image of good quality are discharged into the delivery tray.

There has been disclosed in Japanese Laid-open Patent Application No. 2019-164033, a method for examining the image on a sheet of recording medium. According to this method, a sheet having an image is divided into multiple sections, and the images on multiple sections are sequentially read. Then, the read multiple sections are compared with the referential data, in their position relative to the sheet of recording medium. According to the method disclosed in Japanese Laid-open Patent Application No. 2005-205687, data for examining the image on a sheet of recording medium are produced by adding to the data of the read image, the data related to image processing, to make it possible to determine the effect of the image processing upon the result of the image examination.

By the way, in a case where a print is examined in image quality based on the result of reading of the image on the print, it is possible that during the reading of the image, an image reading apparatus will fluctuate in sheet conveyance speed. If an image reading apparatus fluctuates in sheet conveyance speed while it is reading a print, it is possible that the image reading apparatus will fail to correctly determine the position of each of the aforementioned image sections relative to the sheet of recording medium, making it possible for the image reading apparatus to reduce in accuracy. The fluctuation in sheet conveyance speed is attributable to the errors in the position of conveyance rollers, which occur during the assembly of the system, mechanical wear, thermal contraction of rollers, and/or mechanical changes which occur to the mechanism for conveying sheets. The image formation system disclosed in Japanese Laid-open Patent Applications No. 2019-164033, and 2005-205687, is not structured to deal with the mechanical changes which occur to the sheet conveyance mechanism. Therefore, they are substantial in the amount of fluctuation in sheet conveyance speed, being therefore low in the quality of examination.

SUMMARY OF THE INVENTION

The present invention provides means for minimizing an image formation system in the amount of error in terms of the position of an image on a sheet of recording medium, relative to the sheet of recording medium, which occurs when the image is read.

According to an aspect of the present invention, there is provided an image forming system comprising: an image forming apparatus provided with an image forming unit configured to form an image on a sheet; and an image reading apparatus, connected to said image forming apparatus, configured to read the image formed on the sheet by said image forming apparatus, wherein said image forming apparatus comprises: a first pair of conveying rollers configured to nip and convey the sheet on which the image is formed by said image forming unit; and a first motor configured to drive said first pair of conveying rollers so that a conveying speed of the sheet conveyed by said first pair of conveying rollers becomes a first speed, wherein said image reading apparatus comprises: an image reading unit configured to read the image formed on the sheet; a second pair of conveying rollers arranged downstream of said first pair of conveying rollers with respect to a conveying direction of the sheet and configured to nip and convey the sheet toward said image reading unit; and a second motor configured to drive said second pair of conveying rollers so that a conveying speed of the sheet conveyed by said second pair of conveying rollers becomes a second speed lower than the first speed, so as to form a loop of the sheet between said first pair of conveying rollers and said second pair of conveying rollers with respect to the conveying direction.

Further features of the present invention will become apparent from the following description of exemplary embodiments (with reference to the attached drawings).

BRIEF DESCRIPTION OF THE DRAWINGS

Parts (A) to (D) of FIG. 6 are graphs which show the behavior of a sheet of recording medium, respectively, which occurs while the sheet is conveyed through the image reading unit in the first embodiment.

Part (A) of FIG. 7 is a drawing for showing how a sheet of recording medium is conveyed through the image reading apparatus in the first embodiment.

Part (B) of FIG. 7 is a drawing for showing how a sheet of recording medium is conveyed through the image reading apparatus in the second embodiment.

Part (C) of FIG. 7 is a drawing for showing how a sheet of recording medium is conveyed through the image reading apparatus in the third embodiment.

DESCRIPTION OF THE EMBODIMENTS

Hereinafter, the printing system 1000A in a few of preferred embodiments of the present invention are described with reference to the appended drawings.

Figure 1:
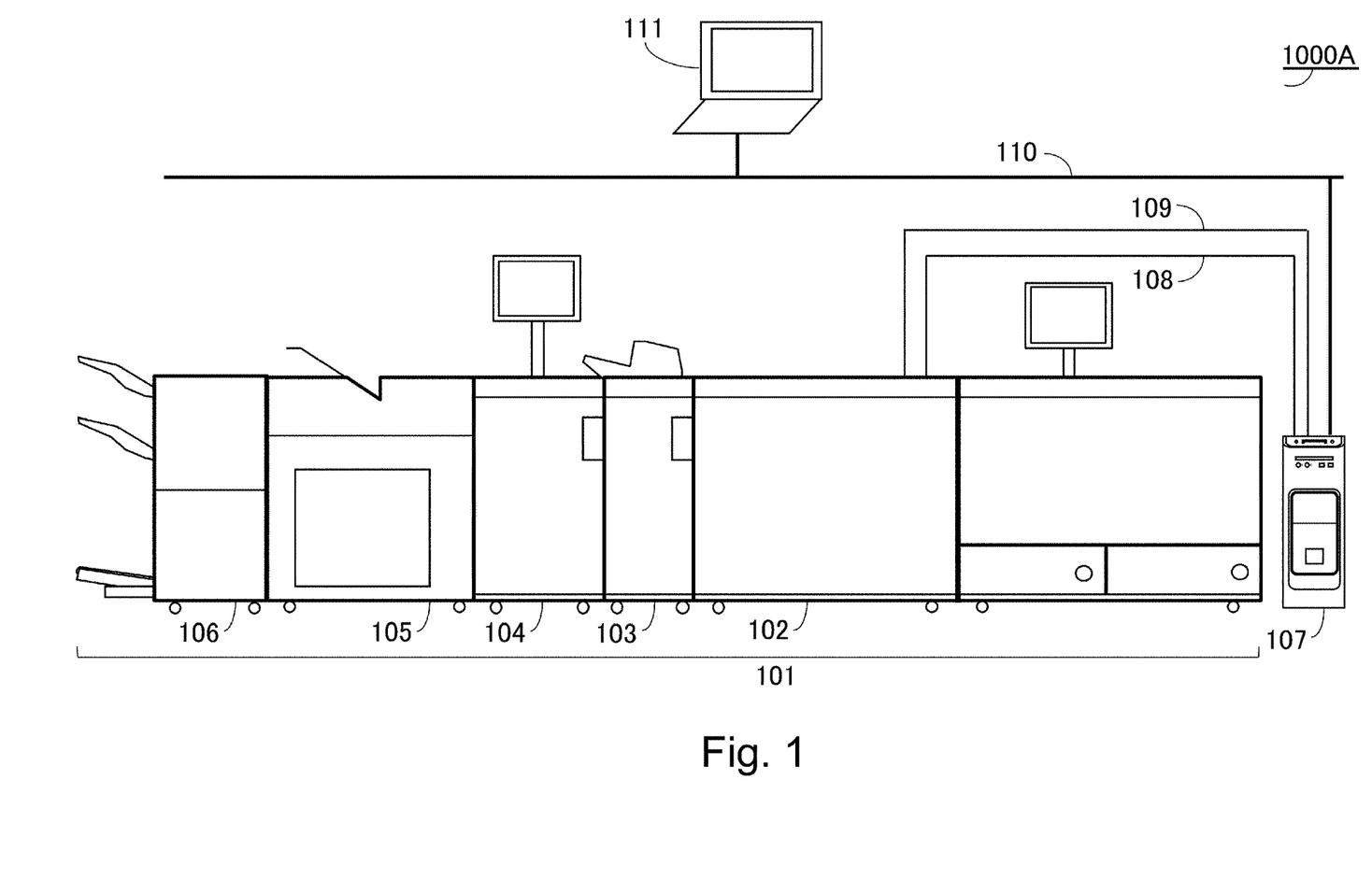
FIG. 1 is a side view of the printing system in the first embodiment of the present invention; it shows the general structure of the system.

FIG. 1 is a side view of the printing system 1000A in the first embodiment of the present invention. It shows the general structure of the system. By the way, the present invention is applicable to any system as long as the system is structured so that it can perform the functions which the printing system 1000A is capable of performing through a network such as LAN and WAN. That is, the present invention is applicable to any image formation system which comprises two or more printing apparatuses structured like the one in this embodiment.

Referring to FIG. 1, the printing system 1000A includes an engine unit 101 for forming an image on a sheet of recording medium, an external terminal 107, and a client terminal 111. The engine unit 101 has a printing unit 102, an inserter 103, an image reading apparatus 104, a stacking unit 105, and a finisher 106. In this embodiment, the image reading apparatus 104 is an optional unit which is connectible to the printing system 1000A. Each of the image reading apparatus 104, inserter 103, and printing unit 102 is provided with casters, which are attached to the bottom portion of their casing. They are structured so that they can be independently carried around away from the units. Thus, the image reading apparatus 104 is selectively attachable to the inserter 103.

Further, in this embodiment, the image reading apparatus 104 is in connection to the downstream side of the inserter 103 in terms of the sheet conveyance direction. However, the present is also compatible with a printing system which does not have the inserter 103, and therefore, the image reading apparatus 104 of which is directly in connection to the printing unit 102. In such a case, the image reading apparatus 104 is directly connected to the printing unit 102, instead of the inserter 103. Further, the printing system 1000A in this embodiment may be structured so that a cooling apparatus for cooling a sheet of recording medium as the sheet is conveyed thereto from the printing unit 102, is disposed between the inserter 103 and image reading apparatus 104. In such a case, the image forming apparatus includes the printing unit 102 and cooling apparatus.

The printing unit 102 carries out a process for forming an image on a sheet of recording medium. The inserter 103 carries out a process of inserting a so-called slip sheet between two preselected consecutive sheets of recording medium after the formation of images thereon, to obtain intended sets of prints. The image reading apparatus 104 carries out a process of reading the image of a print, to examine the print in image quality, immediately after the formation of an image on a sheet of recording medium. That is, the printing system 1000A functions also as an image formation system, the image reading apparatus 104 of which reads (scans) a print after the formation of the image on the sheet of recording medium. The stacking unit 105 is an example of a discharging apparatus, into which a print (sheet of recording medium) is discharged after the print is conveyed through the image reading apparatus 104. The finisher 106 carries out a process of finishing (stapling, punching, etc.) each stack of a preset number of prints (sheets of recording medium). As described above, the engine unit 101 comprises multiple subunits which are different in the process they carry out. That is, not only can it form an image on a sheet of recording medium, but also, carries out various complicated processes such as binding. Further, the engine unit 101 is provided with a sheet conveying means such as a conveyance roller pair 343 (FIGS. 4 and 5) for conveying a sheet of recording medium downstream of the engine unit 101 after the formation of an image on the sheet by the printing unit 102. It is also provided with motors M1-M3 (FIGS. 4 and 5) for driving the sheet conveying means such as the conveyance roller pair 343.

The printing unit 102 is in connection to the external terminal 107 so that it can communicate with the external terminal 107 through an internal LAN 108 and a video cable 109. The external terminal 107 is in connection with the client terminal 111 through an external LAN 110, so that it can communicate with the client terminal 111. The external terminal 107 is in connection to the client terminal 111 through the external LAN 110, making it possible for the external terminal 107 to communicate with client terminal 111 so that a command for making the printing system 1000A to carry out an image formation process for forming an image on a sheet of recording medium can be issued. In the client terminal 111, a print driver, which has a function to convert image data into a print description language, which is processable by the external terminal 107, is installed. A user can command the printing system 1000A to carry out an image formation process by operating the client terminal 111, with the use of the print driver among various applications. The print driver transmits to the external terminal 107, such data that were obtained by converting the image data into print description language which is processable by the external terminal 107. As the external terminal 107 receives the converted data from the client terminal 111, it outputs the converted data to the printing unit 102 to start an image formation process. Here, the printing system 1000A is structured so that the external terminal 107 is in connection to the printing unit 102. Instead, it may be structured so that the printing unit 102 is in connection to the external LAN 110 to transmit the converted data, which is processable by the printing unit 102, from the client terminal 111 to the printing unit 102.

Further, the printing system 1000A is enabled to carry out such an examination process as a comparative examination process for comparing the data of the image of a print read by the image reading apparatus 104, with the data of an original. It can also carry out an examination process for determining whether or not such codified information as bar codes included in the image on a sheet of recording medium, an examination process for collating the image on the front side of a sheet of recording medium with the one on the back side of the sheet, etc. In this embodiment, the software for carrying out the examination processes are installed in the client terminal 111 and external terminal 107. However, the printing system 1000A may be designed so that the examination processes are carried out by the control portion 203 (FIG. 2) of the image reading apparatus 104.

Figure 2:
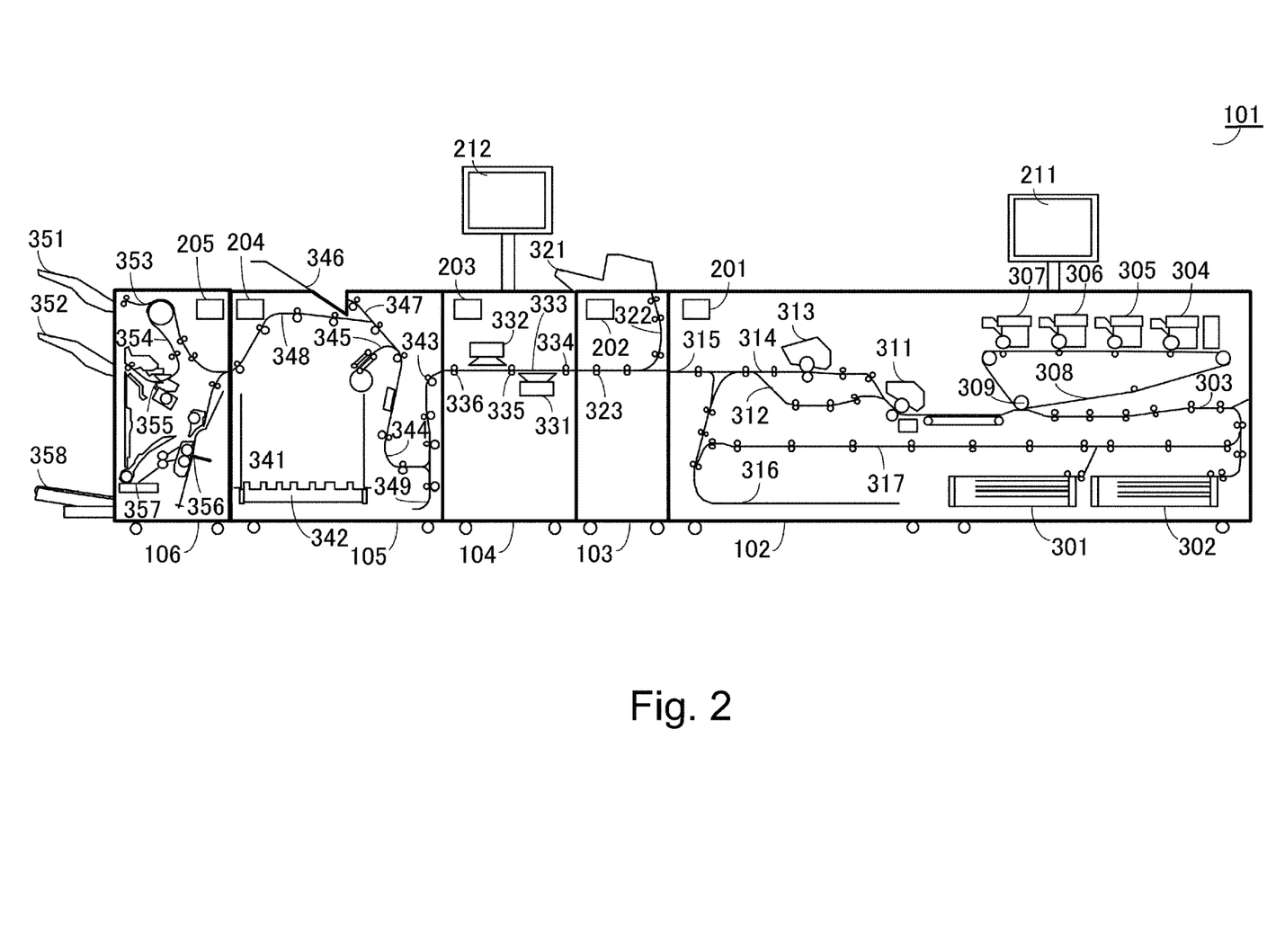
FIG. 2 is a schematic sectional view of the printing system in the first embodiment.

Next, referring to FIG. 2, the engine unit 101 is described about its structure. FIG. 2 is a schematic sectional view of the engine unit 101. In this embodiment, the printing unit 102 is equipped with an electrophotographic image formation engine. However, it may be equipped with an image formation engine of inkjet type, instead of an electrophotographic one. In a case where the engine unit 101 comprises two or more printing apparatuses, the image formation engines may be different in type. First, the structure of the printing unit 102, and the flow of the image formation process to be carried out by the printing unit 102, are described. The printing unit 102 has feeder decks 301 and 302, and development units 304, 305, 306 and 307. Further, the printing unit 102 has an intermediary transfer belt 308, a secondary transferring portion 309, a first fixation unit 311, a second fixation unit 313, and the control portion 201 which controls the overall operation of the printing unit 102. Each of the feeder decks 301 and 302 is a sheet feeding means for feeding the sheets of recording medium in the feeder decks 301 and 302, which are in the bottom portion of the printing unit 102, into the main assembly of printing unit 102. The feeder decks 301 and 302 separate only the topmost sheet of recording medium in them, from the rest, and feed the topmost one toward a path 303.

Each of the development units 304, 305, 306 and 307 is an image forming means for forming a toner image with the use of color toner, more specifically, black (K), cyan (C), magenta (M) and yellow (Y) toners, respectively. The development units 304, 305, 306 and 307 are the same in structure, even though they are different in the color of the toner they use. Therefore, only the image forming operation of the development unit 307 is described; the image forming operation of the development units 304, 305 and 306 is not described. A photosensitive drum, which is one of the structural components of the development unit is charged to a preset potential level. Then, a beam of light, for example, a beam of laser light, is projected, as a scanning beam of light, upon the charged photosensitive drum while being modulated with the image data, by a rotational polygonal mirror. Consequently, an electrostatic latent image is formed on the peripheral surface of the photosensitive drum. Then, the electrostatic latent image on the photosensitive drum is developed into a visible image (yellow image formed of yellow toner) by the toner in a developing means container. Then, the yellow toner image is transferred (primary transfer) onto the intermediary transfer belt 308. A sequential image formation process which is similar to the above described one is carried out in each of the development units 304, 305 and 306, which use the black (K), cyan (C) and magenta (M) toners, respectively. As a result, the yellow, magenta, cyan and black toner images are transferred (primary transfer) onto the intermediary transfer belt 308. The intermediary transfer belt 308 rotationally moves in the clockwise direction shown in FIG. 2. In the secondary transferring portion 309, the toner images on the intermediary transfer belt 308 are transferred (secondary transfer) onto a sheet of recording medium conveyed thereto through the path 303. Consequently, a full-color image is realized on the sheet.

After the realization of the full-color image on the intermediary transfer belt 308, the sheet is conveyed to the first fixation unit 311, which is a fixing apparatus for fixing a toner image to a sheet of recording medium. It has a pressure roller and a heat roller. While a sheet of recording medium having a toner image is conveyed through the nip between the pressure roller and heat roller, the toners, of which the full-color image is formed, are pressed while being melted. As a result, the toner image becomes fixed to the sheet. After being conveyed through the first fixation unit 311, the sheet is conveyed through a path 312, and then, a path 315. By the way, the amount by which heat and pressure need to be applied to a sheet of recording medium by a fixation unit is determined by the type of recording medium. Thus, if it is necessary to apply additional amount of heat and pressure to the sheet after the first fixation by the first fixation unit 311, the sheet is conveyed to a path 315 from the path 312 after being conveyed through the first fixation unit 311. Consequently, the sheet is conveyed through the second fixation unit 313, in which heat and pressure are applied to the sheet for the second time. Then, the sheet is conveyed to the path 315. In a case where the printing unit 102 is in the two-sided (first and second surfaces) mode, the sheet is conveyed to a reversal path 316 after the fixation of a toner image to the first surface of the sheet. Then, it is conveyed to a path 317, being thereby reversed in attitude in terms of the vertical direction. Then, the sheet is conveyed through the two-sided mode path 317, to the second transferring portion 309, for the second time, in which an image is formed on the second surface of the sheet. Further, printing unit 102 is provided with a displaying apparatus 211, which is an example of means for providing a user with the information related to the state of progression of an image formation process, system settings, etc.

After the formation of an image on a sheet of recording medium in the printing unit 102, the sheet is conveyed to the inserter 103, which has an inserter tray 321, in which slip sheets are held in layers. The inserter tray 103 feeds the layered slip sheets in the tray 321, one by one, into a path 322. As a slip sheet is fed into the path 322 from the inserter tray 321, it is conveyed further in such a manner that it moves into the interval between predetermined two prints (sheets) which are being conveyed image reading apparatus 104 from the printing unit 102. As a result, the printing system 1000A outputs a set of prints, which comprises a preset number of subsets of prints separated by slip sheets.

After being conveyed through the inserter 103, each print is conveyed to the image reading apparatus 104, which has image reading sensors 331 and 332, which are the image reading units in this embodiment. The image reading sensors 331 and 332 obtain the images of the bottom and top surfaces, respectively, of each print. That is, the image of the second surface of each print, which is the opposite surface of the print read by the image reading sensor 331, is read by the image reading sensor 332. An example of the first image reading portion in this embodiment is the image reading sensor 331, and an example of the second image reading portion is the image reading sensor 332. By the way, each of the image reading sensors 331 and 332 is a CIS, a CCD, or the like. In this embodiment, it is a CIS. The image reading apparatus 104 is provided with conveyance roller pairs 334, 335, 336 and 337 as sheet conveying means in this embodiment. In this embodiment, the images of a print are read with the use of the image reading sensors 331 and 332 with the timing with which the print reaches preset positions in the path 333, while the print is conveyed through the path 333 by the conveyance roller pairs 334, 335 and 336. Therefore, the fluctuations which occur to the speed of a print while the print is conveyed past the points at which the image reading sensors 331 and 332 read the print, becomes the cause of the fluctuation in the position points at which the image reading sensors 331 and 332 read the print. The data of the images of a print read by the image reading apparatus 104 are transmitted to the client terminal 111 and/or external terminal 107. Further, the image reading apparatus 104 is provided with the displaying apparatus 212, which is an example of informing means for informing a user of the results of the examination process carried out by the client terminal 111 and external terminal 107. After a print is conveyed through the image reading apparatus 104, it is conveyed to the stacking unit 105.

The stacking unit 105 has the stack tray 341, which is one of the trays, into which prints (sheets of recording medium) are discharged in such a manner that they are stacked. The stack tray 341 can stack prints (sheets of recording medium) as the prints are discharged into the stack tray 341. After being conveyed through the image reading apparatus 104, each print is conveyed through a path 343. As the print reaches the stacking unit 105, it is discharged into the stack tray 341 by way of paths 344 and 345. Further, the stacking unit 105 is provided with an escape tray 346, which is also a delivery tray, but, different from the stack tray 341, in that the escape tray 346 is a delivery tray into which a print is discharged if it is determined, based on the results of the examination of the images of the surfaces of each print read by the image reading apparatus 104, that the print has an image defect. In a case where a print is discharged into the escape tray 346, the print is conveyed from the path 344 to the escape tray 346 by way of a path 347. By the way, in a case where a print is conveyed to a finisher 106, which is on the downstream side of the stacking unit 105 in terms of the sheet conveyance direction, the print is conveyed through a path 348. An inversely conveying portion 349 conveys a print in such a manner that as the print comes out of it, the print becomes inverted. The inversely conveying portion 349 is used when it is necessary to stack prints in the stack tray 341. In a case where it is necessary to stack prints in the stack tray 341 in such a manner that the orientation in which a print will be as the print arrives at the stacking unit 105 is the same as that in which the print will be when the print is discharged into the stack tray 341, the print is reversed once in the reversely conveying portion 349. In a case where it is necessary to convey a print to the escape tray 346 or finisher 106, the print is discharged without being reversed. Therefore, the print is not reversed with the use of the reversely conveying portion 349.

Concretely describing, the finisher 106 finishes prints as they are delivered to the finisher 106. For example, it can staple the prints (single point stapling, double points stapling, etc.), punch holes (two holes, three holes, etc.) through the prints, or saddle stitch the prints. The finisher 106 has a delivery tray 351, into which prints are discharged by way of a path 353, and a delivery tray 352, into which prints are discharged by way of the post-processing portion 355. In a case where it is necessary for prints to be subjected to such a finishing process as stapling, the prints are conveyed by way of a path 354, to the post-processing portion 355, in which they are subjected to a finishing process specified by a user. Then, they are discharged into the delivery tray 352. As for the prints which are not required by a user to be subjected to the finishing process, they are discharged into the delivery tray 351 by way of a path 353. By the way, the printing system 1000A is structured so that delivery trays 351 and 352 can be moved upward or downward. Therefore, the delivery tray 351 can be lowered to stack prints into the delivery tray 351 after being subjected to a finishing process. Further, in a case where the printing system 1000A is set to saddle-stitch prints, prints are saddle-stitched (stapled along center line of print), folded in half, and discharged into a saddle-stitching (binding) delivery tray 358 by way of a path 357. The saddle-stitching (binding) tray 358 comprises a belt conveyer. Thus, as a bundle of prints, that is, saddle-stitched prints, is discharged into the saddle-stitching (binding) delivery tray 358, it is conveyed leftward of FIG. 2.

As the control portion 201 of the printing unit 102, control unit 202 of the inserter 103, control portion of the image reading apparatus 104, control portion 204 of the stacking unit 105, and control portion 205 of finisher 106, a microcomputer can be used. By the way, as the microcomputer, one of those, the primary components of which are a CPU, a ROM, a RAM and I/O interface, and the like hardware, may be used. The control portion 201 reads the information stored in the ROM, by communicating with the control portion 202 of the inserter 103, control portion 203 of the image reading apparatus 104, control portion 204 of the stacking unit 105, and control portion 205 of the finisher 106. Further, the control portion 201 makes the printing unit 102, inserter 103, image reading apparatus 104, stacking unit 105, and finisher 106 operate in concert, by setting sheet conveyance speed for the engine unit 101, based on the information obtained by the reading. This is how the entirety of the engine unit 101 is integrally controlled in operation by the control portion 201. By the way, the control portion 201 is an example of control portion. For example, the printing system 1000A may be structured so that a control portion other than the control portion 201 integrally controls the overall operation of the engine unit 101.

Figure 3:
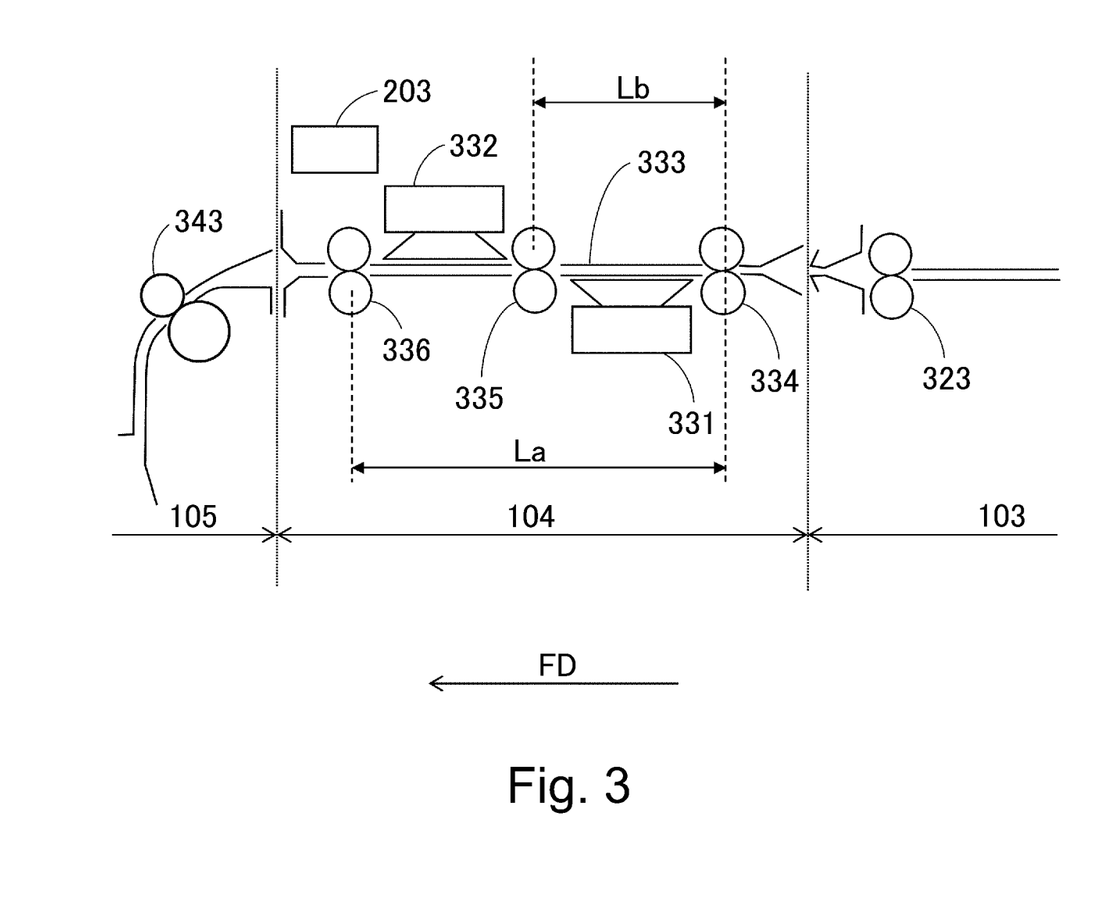
FIG. 3 is a schematic sectional view of the image reading unit in the first embodiment; it shows the general structure of the unit.

Next, what occurs to a print when the print is read by the image reading apparatus 104 in this embodiment so that the obtained image of the print is used to examine the print in quality is described. First, referring to FIG. 3, the image reading apparatus 104 is described about its general structure. FIG. 3 is a schematic sectional view of the image reading apparatus 104. FIG. 3 shows a part of the inserter 103, which is on the upstream side of the image reading apparatus 104, in terms of the sheet conveyance direction, and a part of the stacking unit 105 which is on the downstream side of the image reading apparatus 104, along with the image reading apparatus 104. The image forming apparatus in this embodiment includes the printing unit 102 and inserter 103. The sheet (print) discharging apparatus in this embodiment includes the stacking unit 105 and finisher 106. The inserter 103, which conveys a sheet of recording medium to the image reading apparatus 104, as an image reading apparatus, after the formation of an image on the sheet, conveys the sheet into the path 333 in the image reading apparatus 104 with the use of the conveyance roller pair 323 as the first conveyance roller pair. The inserter 103 is in connection to the image reading apparatus 104 as the image reading apparatus in this embodiment. It is an apparatus structured to convey a sheet (print) toward the image reading apparatus 104. Further, in the engine unit 101 shown in FIG. 2, the image reading apparatus 104 is in connection to the inserter 103. Therefore, the conveyance roller pair 323 functions as the first conveyance roller pair in this embodiment. In the path 333 of the image reading apparatus 104, the conveyance roller pairs 334, 335 and 336 are disposed in the listed order, in terms of the upstream-to-downstream direction in terms of the sheet conveyance direction. The conveyance roller pairs 334, 335 and 336 make up the sheet conveying means in this embodiment. The second conveyance roller pair in this embodiment is equivalent to the conveyance roller pair 334, and the fourth conveyance roller pair is equivalent to the conveyance roller pair 336. The fifth conveyance roller pair is equivalent to the conveyance roller pair 335.

The stacking unit 105 is a part of the sheet discharging apparatus in this embodiment. The conveyance roller pair 343 of the stacking unit 105 is disposed in a position in which it can catch a print (sheet of recording medium having an image) as the print is discharged from the image reading apparatus 104. In this embodiment, the conveyance roller pair 343, which is the third conveyance roller pair in this embodiment, catches a print as the print is discharged from the image reading apparatus 104 by the conveyance roller pair 336 of the image reading apparatus 104. In this embodiment, the conveyance roller pairs 334 and 335 are positioned so that the leading edge of a print enters the nip of the conveyance roller pair 335 before the trailing edge of the print comes out of the nip of the conveyance roller pair 334. Similarly, the conveyance roller pairs 335 and 336 are positioned so that the leading edge of a print enters the nip of the conveyance roller pair 336 before the trailing edge of the print comes out of the nip of the conveyance roller pair 335.

In terms of the sheet conveyance direction, the image reading sensor 331 is positioned between the conveyance roller pair 334 and conveyance roller pair 335. In terms of the vertical direction, it is positioned on the bottom side of the path 333 in such a manner that it faces the print while the print is conveyed through the path 333. It is a sensor for reading the downwardly facing surface (first surface) of the print while the print is conveyed through the path 333. It has a light source for shedding light upon the print while the print is conveyed past the detection position in the path 333, and a line image sensor which comprises a CIS or the like. The line image sensor comprises multiple reading elements which convert the light reflected by a pixel, into an equivalent amount of electrical voltage. The reading elements are aligned in the direction parallel to the widthwise direction of a print (sheet) (intersectional to sheet conveyance direction FD). The reading range of the image reading sensor 331 is desired to be set so that the image reading sensor 331 is enabled to read even the largest print (sheet) conveyable through the image reading apparatus 104. However, the image reading apparatus 104 may be structured so that multiple image reading sensors are arranged in multiple lines which are parallel to the widthwise direction of the print, or arranged in a zig-zag pattern. The image reading sensor 331 reads a print line-by-line in terms of the widthwise direction of the print as the print is moved past the detection position. Then it outputs the data of the image of the print. As the image data are outputted, they are transmitted to the control portion 203. More concretely, as the entirety of the first surface of the print are read by the image reading sensor 331, data which are equivalent in amount to the two-dimensional image on the first surface of the print are obtained by the image reading sensor 331. Then, the data are transmitted from the image reading sensor 331 to the control portion 203.

The image reading sensor 332 is positioned between the conveyance roller pair 335 and conveyance roller pair 336, in such a manner that it faces a print while the print is conveyed through the path 333. It is a sensor for reading the top surface (second surface) of the print which the print is conveyed through the path 333. The image reading sensor 332 has a light source which sheds light upon a print while the print is conveyed past the detection position in the path 333, and a line image sensor like a CIS. The line image sensor comprises multiple reading elements, each of which converts the light reflected by each pixel into such voltage that is equivalent in amount to the amount by which the light from the light source is reflected by the pixel. The multiple elements are one-dimensionally aligned in the widthwise direction (which is intersectional to sheet conveyance direction FD). The reading range of the image reading sensor 332 is desired to be set so that even the largest print that is conveyable through the image reading apparatus 104 can be read by the image reading sensor 332. However, the image reading apparatus 104 may be structured so that the multiple image reading sensors are positioned in multiple lines which are parallel to the widthwise direction of the print, or arranged in a zig-zag pattern. The image reading sensor 332 reads a print line-by-line in terms of the widthwise direction of the print as the print is moved past the detection position. Then, it outputs the data of the image of the print. As the image data are outputted from the image reading sensor 332, they are transmitted to the control portion 203. More concretely, as the entirety of the first surface of the print is read by the image reading sensor 332, such data that are equivalent in amount to the two-dimensional image on the first surface of the print are obtained by the image reading sensor 332. Then, the data are transmitted from the image reading sensor 332 to the control portion 203.

The control portion 203 is in the form of a microcomputer, the primary components of which are a CPU, a ROM, a RAM and I/O interface. It integrally controls the image reading apparatus 104 in operation. As the control portion 203 receives the image date from the image reading sensors 331 and 332, it transmits the image data to the external terminal 107 and client terminal 111 by way of the control portion 201 and internal LAN 108 of the printing unit 102, external LAN 110, etc. (FIG. 1). Regarding the method used by the printing system 1000A to correct the image data is to compare the position of the leading edge of a print with a specific point of the extracted image, based on the image data outputted from the image reading sensors 331 and 332. By computing the relationship between the position of the leading edge of the print and that of the specific point of the image, recognizing mainly the expansion, contraction, bending, and tilting of the image, to correct the image data. The image data are corrected by primarily the external terminal 107 and client terminal 111. However, the printing system 1000A may be structured so that the image data are corrected by the control portion 201 or 203. In the case of the print examination in this embodiment, after the image data are corrected as described above, whether or not a print has image defects is determined based on a comparative examination, an examination for finding out whether or not the codified information, for example, a bar-code, included in the image of the print is readable, an examination to find out whether or not the amount of pixel shift obtained through a front-back comparison examination, etc., exceeded a threshold value, etc. By the way, in the following description of this embodiment, the distance between the conveyance roller pairs 334 and 335 in terms of the sheet conveyance direction FD is referred to as Lb, and the distance between the conveyance roller pairs 334 and 336 is referred to as La.

As described above, in the case of the image reading apparatus 104, the image reading sensors 331 and 332 read a print while the print is conveyed through the path 333. By the way, it has been problematic that the speed with which a print is conveyed by the conveyance roller pairs 323, 334, 335, 336 and 343 is affected by the deviation in the position of the image reading apparatus 104, thermal contraction of rollers, and the like factors. At this point, the effects of the fluctuation in the speed with which a print is conveyed in a conventional printing system is described.

Figure 6:
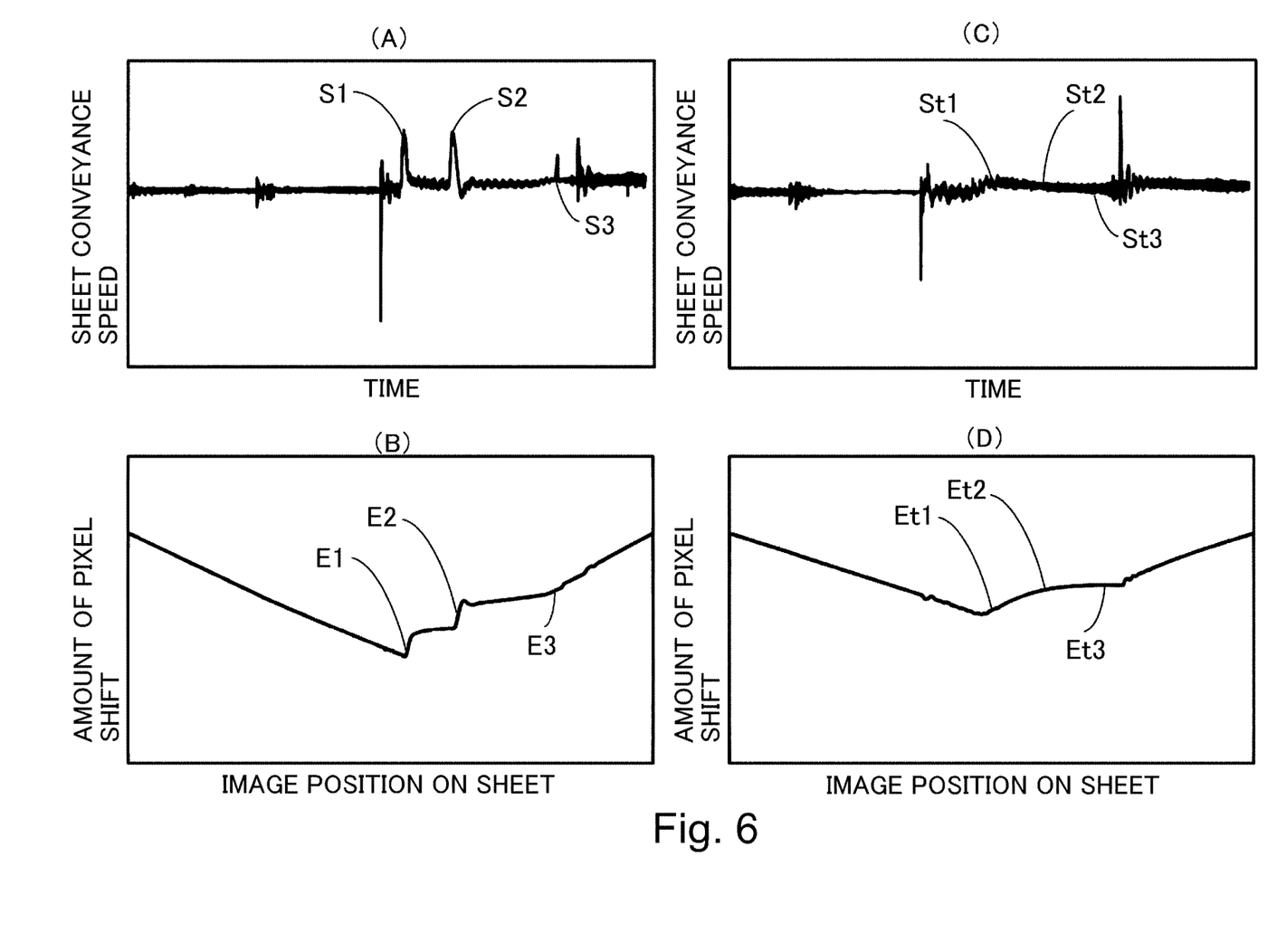

FIGS. 6(A, B) show the print behaviors which occur in the inserter 103 and image reading apparatus 104 when the inserter 103 and image reading apparatus 104 are the same in the sheet conveyance speed. FIG. 6(A) shows the relationship between the speed with which a print is conveyed past the image reading sensors 331 and 332, and the length of time it takes for print to be conveyed between the image reading sensors 331 and 332. FIG. 6(B) shows the amount of pixel shift, in terms of the sheet conveyance direction FD, in the linear image data obtained by the image reading sensors 331 and 332. By the way, in the case of a comparative (conventional) printing system 1000A, the inserter 103 and image reading apparatus 104 are the same in the sheet conveyance speed. Referring to FIG. 6(A), in the case of the comparative (conventional) printing system, speed changes S1 and S2 occur when a print comes out of the nip of the conveyance roller pair 323 of the inserter 103. The speed changes S1 and S2 occur because of the error in the positioning of the inserter 103 and/or image reading apparatus 104, which occur while the printing system is assembled, thermal contraction of rollers, and the like factors. Further, speed change S3 occurs because a print vibrates between the conveyance roller pairs 336 and 343 while the print is conveyed by the conveyance roller pair 336 of the image reading apparatus 104, and the conveyance roller pair 343 of the stacking unit 105, while remaining pinched by the conveyance roller pairs 336 and 343. These print (sheet) vibrations propagate upstream, in terms of the sheet conveyance direction FD, through the print, causing the speed change S3 when the image reading sensor 332 reads the print.

In FIG. 6(B), E1 stands for the amount by which a pixel is shifted by speed change S1; E2, by the speed change S2; and E3 stands for the amount by which a pixel is shifted by the speed change 3. For example, in a case where a print speed increases or decreased at a constant rate, the effect of the pixel shift caused by the change in the print speed can be reduced by enlarging or shrinking the print image read by the image reading sensors 331 and 332. As described above, in this embodiment, the image data obtained by the image reading sensors 331 and 332 are compared with the data of an original stored in advance to examine the print. However, if a print frequently (and momentarily) fluctuates in speed as indicated by referential codes S1, S2, S3, a pixel is shifted by an amount E1, E2 or E3, which is too large to be corrected. Therefore, the pixel shift attributable to the fluctuation in print speed which occur while the print is read becomes one of the primary causes of the reduction in the accuracy of image quality examination.

Figure 4:
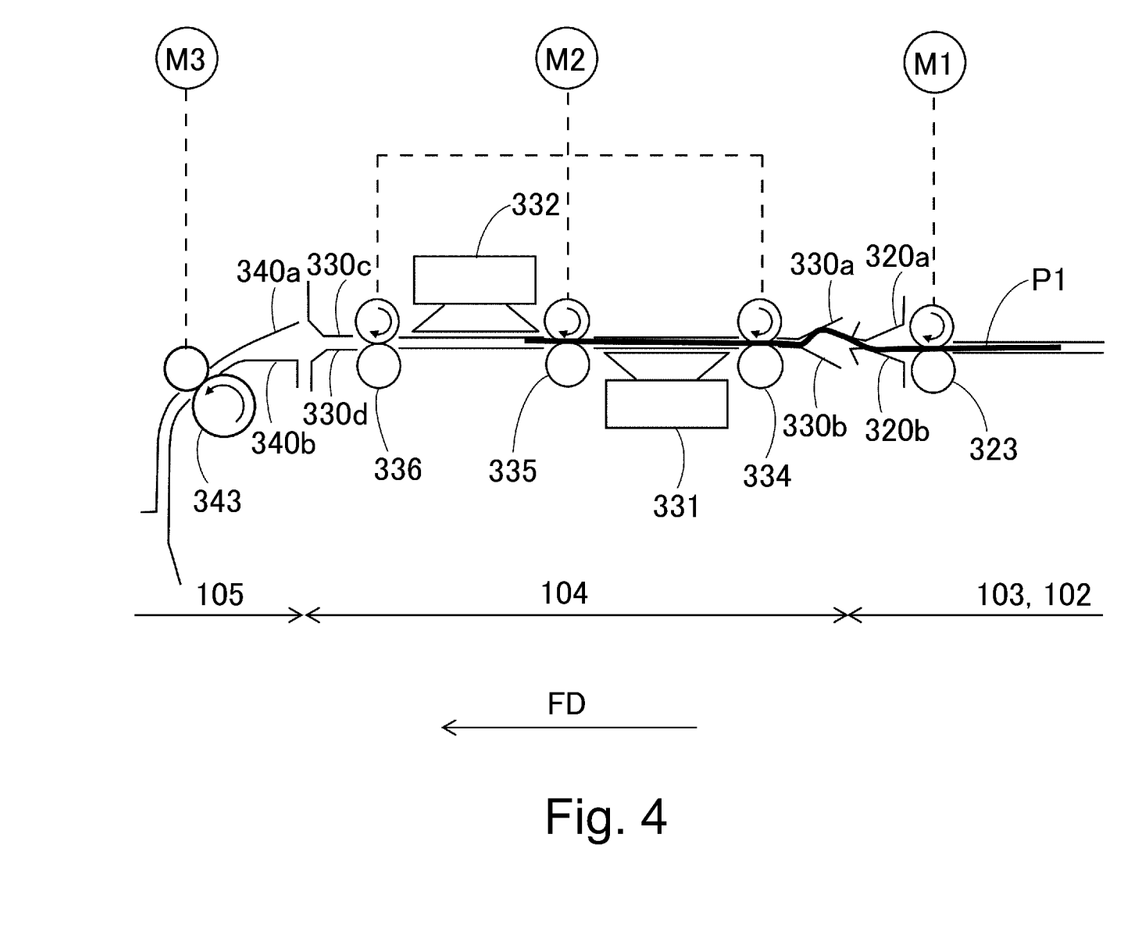
FIG. 4 is a schematic sectional view of the image reading unit when a sheet of recording medium has entered halfway into the unit.
Figure 5:
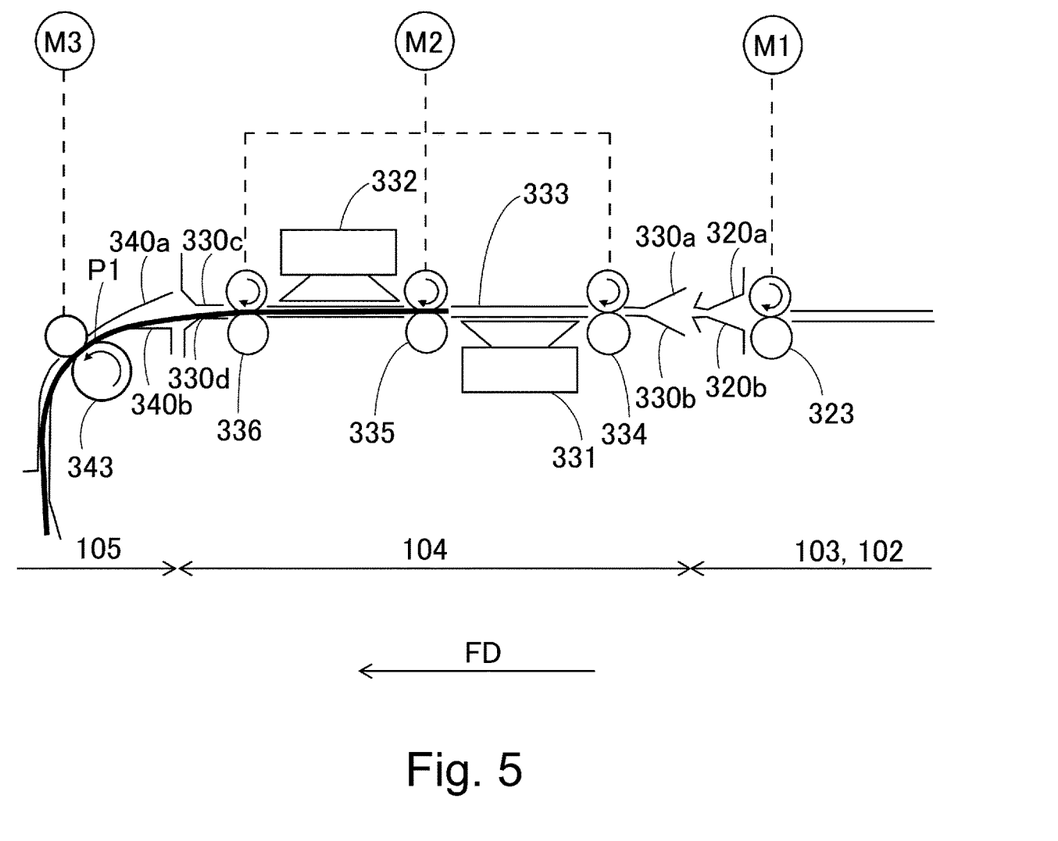
FIG. 5 is a schematic sectional view of the image reading unit when a sheet of recording medium is on its way out of the unit.

In this embodiment, therefore, in order to deal with the above described issue, that is, in order to minimize the effect of the shocks, which occur as the trailing edge of a print comes out of the nip of the conveyance roller pair 323, upon the sheet conveyance speed, the inserter 103 and image reading apparatus 104 are changed in sheet conveyance speed as necessary. Next, what occurs to a print as the inserter 103 and image reading apparatus 104 are changed in print (sheet) conveyance speed is described. FIG. 4 is for describing what occurs to a print P1 between the inserter 103 and image reading apparatus 104. FIG. 5 is for describing what occurs to the print P1 between the image reading apparatus 104 and stacking unit 105. In this embodiment, the printing system 1000A is provided with a motor M2 as a driving means. A motor M1, which is the first driving portion in this embodiment, drives the conveyance roller pair 323. The motor M2, which is the second driving portion in this embodiment, drives the conveyance roller pairs 334, 335, and 336. A motor M3, which is the third driving portion in this embodiment, drives the conveyance roller pair 343. By the way, regarding motor count, the printing system 1000A may be provided with other motors than those shown in FIGS. 4 and 5.

In this embodiment, the motors M1 and M2 are driven so that the first speed, which is the speed at which a print is conveyed by the conveyance roller pair 324, turns into the second speed, which is slower than the first speed at which the print is conveyed by the conveyance roller pair 323.

Thus, a print is allowed to slacken between the inserter 103 and image reading apparatus 104. By the way, in this embodiment, all that is necessary is that at least one of the inserter 103 or image reading apparatus 104 is provided with a guiding member. In the case of the printing system 1000A shown in FIGS. 4 and 5, the inserter 103 is provided with a pair of guiding members 320a and 320b, whereas the image reading apparatus 104 is provided with a pair of guiding member 330a and 330b. The guiding members 320a and 320b, which are the second and third guiding members in this embodiment, provide the inserter 103 with a space for allowing a print to slacken between the conveyance roller pairs 323 and 334. Further, the guiding members 330a and 330b, which are the second and third guiding members in this embodiment, provide the image reading apparatus 104 with a space for allowing a print to slacken between the conveyance roller pairs 323 and 334.

FIGS. 6(C, D) show what occurs to a print in the inserter 103 and image reading apparatus 104 in this embodiment. FIG. 6(C) shows the relationship between the speed at which a print is moved past the image reading sensors 331 and 332, and the length time it takes for the print to move past the image reading sensors 331 and 332. FIG. 6(D) shows the amount of pixel shift which occurred as the image obtained by the image reading sensors 331 and 332 were converted into an image made up of multiple lines of image elements, which are in parallel to the sheet conveyance direction FD. As described above with reference to FIG. 5, in this embodiment, the print P1 slackens between the inserter 103 and image reading apparatus 104 in terms of the direction FD in which a print P1 is conveyed. Therefore, the shock to which the print P1 is subjected when the trailing end of the print P1 comes out of the nip between the conveyance roller pair 323 is absorbed by the slackening of the print P1. Referring to FIG. 6(C), because the shock is absorbed by the slackening of the print P1, the rates St1 and St2, at which the print P1 is changed in speed, become smaller than the rates S1 and S2 at which the print P1 is changed in speed as shown in FIG. 6(A).

The speed at which a print is conveyed by the conveyance roller pair 343 is referred to as the third speed. In this embodiment, the motors M2 and M3 are driven in such a manner that the print conveyance speed of the conveyance roller pair 336 turns into the fourth speed, which is slower than the third speed. In this embodiment, all that is necessary is that at least one of the image reading apparatus 104 and stacking unit 105 is provided with guiding members. In FIGS. 4 and 5, the image reading apparatus 104 and stacking unit 105 are provided with a pair of guiding members 330c and 330d, and a pair of guiding members 340a and 340b, respectively. The guiding members 330c and 330d, or guiding members 340a and 340b, are the first guiding members in this embodiment. The guiding members 330c and 330d and guiding member 334a are shaped so that they curve toward the conveyance roller pair 343 from the conveyance roller pair 336 side. Since the print conveyance speed of the conveyance roller pair 343 is made higher than the sheet conveyance speed of the conveyance roller pair 336, a print is tensioned while it is conveyed between the conveyance roller pairs 336 and 343, remaining pinched by the conveyance roller pairs 336 and 343. Further, the guiding members 330c and 330d and guiding members 340a and 340b are provided with curvature. Therefore, the trailing edge of the print P1 comes into contact with guiding member 330d or 340b and slides on the one of the guiding members 330d or 340b. Therefore, the print P1 is prevented from vibrating while being conveyed. That is, the print P1 is conveyed from the conveyance roller pair 336 toward the conveyance roller pair 343, in such a manner that its trailing edge comes into contact with the guiding members 330c and 330d or guiding members 340a and 340b and slides on the guiding members. Therefore, it is prevented that while a print P1 is conveyed between the conveyance roller pair 336 of the image reading apparatus 104 and the conveyance roller pair 343 of the stacking unit 105 while remaining pinched by the conveyance roller pairs 336 and 343, the print P1 vibrates between the conveyance roller pair 336 and conveyance roller pair 343. Since the print P1 is prevented from vibrating as shown by FIG. 6(C), the rate St3 at which the print P1 is changed in speed is less than the rate S3 at which the print P1 is changed in speed as shown in FIG. 6(A).

In FIG. 6(D), Et1 stands for the amount of the pixel shift which occurs when the rate of speed change is St1; Et2, the amount of pixel shift which occurs when the rate of speed change is S2; and Et3 stands for the amount of pixel shift which occurs when the rate of speed change is St3. It is evident from the comparison between FIGS. 6(B) and 6(D) that FIG. 6(D) is smaller in the amounts E1, E2 and E3 of pixel shift than FIG. 6(B). That is, this embodiment makes it possible to reduce the image reading apparatus 104 in the amount of error in pixel position which occurs when a print is read by the image reading apparatus 104. Therefore, it makes it possible to prevent the image reading apparatus 104 from reducing in accuracy.

Figure 7:
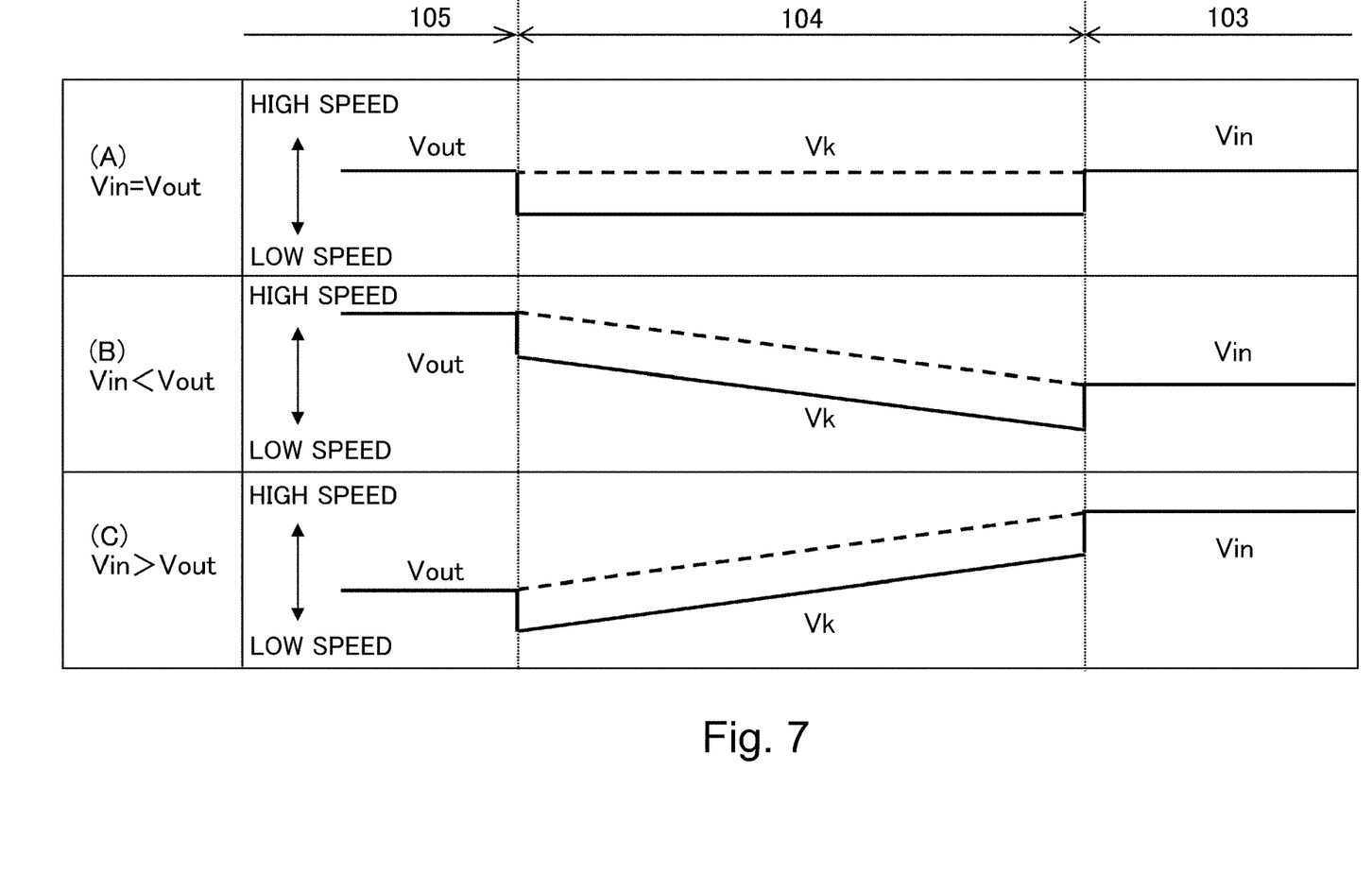

Next, referring to FIGS. 7(A-C), the image reading apparatus 104 in this embodiment is described about its sheet conveyance speed. In FIGS. 7(A-C), Vk stands for the sheet conveyance speed of the image reading apparatus 104. Further, Vin stands for the sheet conveyance speed of the apparatus (inserter 103 in this embodiment) which is on the immediately upstream side of the image reading apparatus 104. Vout stands for the sheet conveyance speed of an apparatus (stacking unit 105 in this embodiment) which is on the immediately downstream side of the image reading apparatus 104, also in terms of the sheet conveyance direction.

EMBODIMENT 1

FIG. 7(A) shows the sheet conveyance speed Vk of the image reading apparatus 104 in this embodiment when the inserter 103 and stacking unit 105 are the same (Vin=Vout) in sheet conveyance speed. In this case, Vk and Vin are set so that Vk is slower than Vin by a preset ratio x (x=0.95). That is, Vk=Vin 0.95. The ratio x is set in consideration of the dimensional tolerance for the sheet conveyance rollers, motors or the like which are for driving the rollers, errors in the positioning of the image reading apparatus 104 and stacking unit 105, and the like factors. Thus, in a case where Vin=Vout=500 mm/s, for example, the minimum value for the sheet conveyance speed Vk of the image reading apparatus 104 is 475 mm/s; Vkmi=500×0.95=475 mm/s. Further, the maximum value for the sheet conveyance speed Vk of the image reading apparatus 104 is 500 mm/s; Vkmax=500×1.00=500 mm/s. That is, the sheet conveyance speed Vk of the image reading apparatus 104 is set to a value in a range of 475 mm/s–500 mm/s.

EMBODIMENT 2

In the Embodiment 1, the sheet conveyance speed Vk of the image reading apparatus 104 when Vin=Vout was described. Shown in FIG. 7(B) is the sheet conveyance speed Vk of the image reading apparatus 104 when the apparatus (stacking unit 105) which is on the downstream side of the image reading apparatus 104 is higher in sheet conveyance speed (Vin<Vout) than the apparatus (inserter 103) on the upstream side.

Sometimes, the stacking unit 105 and finisher 106 are increased in sheet conveyance speed (sheet conveyance speed Vk of image reading apparatus 104) to increase the printing system 1000A in productivity. In such cases, it is desired that the sheet conveyance speed Vk of the image reading apparatus 104 is gradually changed in its sheet conveyance speed Vk from Vin to Vout. In a case where the image reading apparatus 104 is to be gradually changed in its sheet conveyance speed Vt, it will be changed as shown in FIG. 7, in which La stands for the length of the conveyance path between the conveyance roller pairs 334 and 336, and Lb stands for the length of the sheet conveyance path between the referential two pairs of conveyance rollers (which in the second embodiment are conveyance roller pairs 334 and 335).

Shown in FIG. 7(B) is the sheet conveyance speed Vk of the image reading apparatus 104 in the second embodiment when Vin<Vout, and Vk=Vin×preset ratio x+(Vout−Vin) Lb/La (Formula 1). In this case, the image reading apparatus 104 is controlled in Vk, in consideration of the ratio between the aforementioned distance and speed of the image reading apparatus 104, in order to make Vk slower by the preset ratio x relative to Vin and Vout. If Vin=500 mm/s; Vout=600 mm/s; preset ratio x=0.95; La=200 mm; and Lb=80 mm, for example, the sheet conveyance speed Vk1A of the conveyance roller pair 334 is 475 mm/s (Vk1A=500×0.95+(600−500)×0/200=475), with reference to position of the conveyance roller pair 334. Further, the sheet conveyance speed Vk2A of the conveyance roller pair 335 is 515 mm/s (Vk2A=500×0.95+(600−500)×80/200=515. Further, the sheet conveyance speed Vk3A of the third conveyance roller pair 336 is 575 mm/s (Vk3A=500×0.95+(600−500) 200/200=575). That is, in this embodiment, the conveyance roller pairs 323 and 343 are driven by the motors M1 and M3 in such a manner that the sheet conveyance speed Vout of the stacking unit 105 becomes higher than the sheet conveyance speed Vin of the inserter 103. Further, the conveyance roller pairs 334, 335 and 336 are driven by the Motor M2 in such a manner that when the sheet conveyance speed of the image reading apparatus 104 at the first position (position of conveyance roller pair 334, for example) in the path 333 is the fifth sheet conveyance speed of the image reading apparatus 104, the sheet conveyance speed of the image reading apparatus 104 at the second position (position of conveyance roller pair 335, for example), which is on the downstream side of the first position, in the path 333 becomes the sixth speed (conveyance speed Vk2A, for example), which is higher than the fifth speed.

Here, if Vin<Vout, a print is tensioned between the image reading apparatus 104 and stacking unit 105 in terms of the sheet conveyance direction. In this embodiment, a print is allowed to slacken between the inserter 103 and image reading apparatus 104 in terms of the sheet conveyance direction to absorb the shock which occurs as the trailing edge of the print P1 comes out of the nip between the conveyance roller pair 323 (FIG. 6(C)). In such a case, the distance Lb, which is necessary between the conveyance roller pairs 334 and 335 to keep the print P1 slackened between the conveyance roller pairs 334 and 335, can be obtained from the following relationship. In a case where Vin<Vout, as the slack disappears from the print P1, Vk certainly becomes equal in value to Vin (Vk=Vin), in the image reading apparatus 104. That is, there is a relationship between $Vk=Vin \times preset\ ratio\ x+(Vout-Vin) \times Lb/La$, and $Vk=Vin$. If the distance necessary for the print P1 to fully slacken is Lb (=L1), (Formula 1) becomes $L1=Vin \times (1-preset\ ratio\ x)/(Vout-Vin) \times La$. The distance necessary for the slack to completely disappears is: $Lb=L1 \times 2$). That is, the distance between the conveyance roller pairs 334 and 335 is to be set to a value within a range which the image reading apparatus 104 can satisfy: $Lb \leq 2 \times (Vin \times (1-preset\ ratio\ x)/(Vout-Vin) \times La)$. With the distance being set as described above, it becomes possible to increase the printing system 1000A in productivity while keeping the print P1 slackened.

For example, if it is assumed that Vin=500 mm/s; Vout=600 mm/s; preset ratio x=0.95; and La=200 mm, the distance Lb between the conveyance roller pairs 334 and 335, with reference to the position of the conveyance roller pair 334, it is possible to keep the print P1 slackened, if the conveyance roller pair 335 is disposed in such a position that satisfies Lb≤100 mm. Further, in this embodiment, the image reading apparatus 104 is set so that when one of the surfaces of the print P1 is read by the image reading sensors 331 and 332 of the image reading apparatus 104, the speed at which a print is read by the image reading sensors 331 and 332 of the image reading apparatus 104, the image reading apparatus 104 becomes slower in sheet conveyance speed than the printing unit 102. Therefore, the image obtained by the image reading sensors 331 and 332 are longer by the preset ratio than the one on the print P1. In this embodiment, therefore, the image obtained by the image reading sensors 331 and 332 is shortened by the preset ratio x to be made identical in size to the one made by the printing unit 102. By the way, the images obtained by the image reading sensors 331 and 332 are different in their areas which are unstable in scale factor, because sheets (prints) are different in bases weight and/or size. Therefore, the image reading apparatus 104 may be designed so that it can be adjusted in detail in the variable for the reverse conversion, based on the basis weight, size, etc. The image reading apparatus 104 may be designed so that a user interface for adjusting the variable for the reverse conversion is displayed on the displaying apparatus 212 shown in FIG. 2 to make it possible for a user to adjust the variable for the reverse conversion.

EMBODIMENT 3

In the second embodiment, the image reading apparatus 104 is described about its sheet conveyance speed, at which it conveys a sheet (print) when Vin<Vout. Shown in FIG. 7(C) is the sheet conveyance speed at which a print (sheet) is conveyed by the image reading apparatus 104 when an apparatus (stacking unit 105), which is on the downstream side of the image reading apparatus 104 is slower in sheet conveyance speed than the apparatus (inserter 103) which is on the upstream side of the image reading apparatus 104 (Vin>Vout).

It sometimes occurs that the stacking unit 105 and finisher 106 are reduced in sheet conveyance speed (as sheet conveyance speed Vk of the image reading apparatus 104) to ensure that a sufficient amount of time is provided for print examination In such cases, it is desired that the image reading apparatus 104 is set so that the sheet conveyance speed Vk of the image reading apparatus 104 gradually changes from Vin toward Vout. In FIG. 3, La stands for the length of the conveyance path between the conveyance roller pairs 334 and 336, and Lb stands for the length of the conveyance path between the referential two conveyance roller pairs (which in Embodiment 2 are conveyance roller pairs 334 and 335.)

Shown in FIG. 7(C) is the sheet conveyance speed Vk at which a print (sheet) is conveyed through the image reading apparatus 104 in the third embodiment of the present invention when Vin>Vout, and $Vk=Vin \times preset\ ratio\ x\ (Vout-Vin) \times Lb/La$ (Formula 1). In this case, the image reading apparatus 104 is controlled in its sheet conveyance speed Vk in consideration of the ratio between the aforementioned distance and speed in the image reading apparatus 104, so that the sheet conveyance speed Vk becomes slower by the preset ratio x relative to the sheet conveyance speed Vin and Vout. For example, if Vin=600 mm/s; Vout=500 mm/s; preset ratio x=0.95; La=200 mm; and Lb=80 mm, the sheet conveyance speed Vk1B of the conveyance roller pair 334, with reference to the position of the conveyance roller pair 334, is 570 mm/s ($Vk1B=600 \times 0.95+(500-600) \times 0/200=570$), and the sheet conveyance speed Vk2B of the conveyance roller pair 335 is 530 mm/s ($Vk2B=600 \times 0.95+(500-600) \times 80/200=530$). Further, the sheet conveyance speed Vk3B of the conveyance roller pair 336 is 470 mm/s ($Vk3B=600 \times 0.95+(500-600) \times 200/200=470$). That is, in this embodiment, the conveyance roller pairs 323 and 334 are driven by the motors M1 and M2 in such a manner that the sheet conveyance speed Vout of the stacking unit 105 becomes slower than the sheet conveyance speed Vin of the inserter 103. Further, the conveyance roller pairs 334, 335, and 336 are driven by the motor M2 in such a manner that the sheet conveyance speed of the image reading apparatus 104 at the fourth position (position of conveyance roller pair 335, for example), which is on the downstream side of the third position, in terms of the sheet conveyance direction, becomes the eight speed (conveyance speed Vk2B, for example), which is slower than the seventh speed (sheet conveyance speed Vk1B, for example) at the fourth position (position of conveyance roller pair 334, for example), which is on the downstream side of the third position, in the path 333 in the image reading apparatus 104.

The image reading apparatus 104 may be structured so that the sheet conveyance speed of the conveyance roller pairs 334, 335 and 336 of the image reading apparatus 104 in each of the Embodiments 1-3 is geometrically reduced by the preset ratio x, with the use of conveyance rollers which are different in diameter, pulleys which different in diameter, and gears which are different in speed reduction ratio, etc., instead of simply controlling the image reading apparatus 104 in sheet conveyance speed. Further, the speed control may be used in combination with the geometrical means such as the conveyance rollers and pulleys, which are different in diameter from those in the preceding embodiments, and gears which are different in speed reduction ration from those in the preceding embodiments.

MISCELLANIES

In the first embodiment, the printing system 1000A was structured so that the stacking unit 105 and finisher 106, into which prints (sheets) are discharged, are on the downstream side of the image reading apparatus 104 in terms of the sheet conveyance direction. However, these embodiments are not intended to limit the present invention in scope. For example, the present invention is also applicable to any printing system as long as the system is structured so that prints judged to have image defects are separately discharged from prints judged to have no image defect. In such a case, what is connected to the downstream side of the image reading apparatus 104 in terms of the sheet conveyance direction, side by side with the image reading apparatus 104, is a sheet discharging apparatus. Further, the roller pair of a sheet discharging apparatus which receives a print (sheet) from the image reading apparatus 104 is the third conveyance roller pair.

Further, the present invention is also applicable to a printing system which is structured so that a cooling apparatus for cooling prints (sheets) heated by the first and second fixation units 311 and 313 of the printing unit 102 is disposed in place of the inserter 103. In such a case, an image forming apparatus comprises the printing unit 102 and cooling apparatus. Further, the present invention is also compatible with an engine unit which does not have the inserter 103, for example, in which the printing unit 102 is in direct contact with the image reading apparatus 104. In such a case, the image forming apparatus in this embodiment is the printing unit 102, and the first conveying means is the roller pair which conveys a print (sheet) toward the image reading apparatus 104, among the conveyance roller pairs, with which the printing unit 102 is provided.

Further, the present invention is not limited in compatibility regarding the mechanism for conveying prints (sheets) in the printing system 1000A. That is, the present invention is also compatible with a printing system which conveys a print by rotationally driving a belt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-032032 filed on Feb. 27, 2020, which is hereby incorporated by reference herein in its entirety.

What is claimed is:

1. An image forming system comprising:
    an image forming apparatus provided with an image forming unit configured to form an image on a sheet; and
    an image reading apparatus, connected to said image forming apparatus, configured to read the image formed on the sheet by said image forming apparatus,
    wherein said image forming apparatus comprises a first roller pair configured to convey the sheet on which the image is formed by said image forming unit from said image forming apparatus to said image reading apparatus, said first roller pair conveying the sheet at a first speed, and
    wherein said image reading apparatus comprises:
    (a) an image reading unit configured to read the image formed on the sheet by said image forming unit; and
    (b) a second roller pair arranged downstream of said first roller pair with respect to a conveying direction of the sheet and configured to receive the sheet from said first roller pair and convey the sheet toward said image reading unit, said second roller pair conveying the sheet at a second speed lower than the first speed.

2. An image forming system according to claim 1, further comprising:
    a sheet discharging apparatus, connected to said image reading apparatus, configured to discharge the sheet on which the image is read by said image reading apparatus,
    wherein said sheet discharging apparatus comprises a third roller pair configured to convey the sheet conveyed by said image reading apparatus, said third roller pair conveying the sheet at a third speed, and
    wherein said image reading apparatus further comprises a fourth roller pair arranged between said second roller pair and said third roller pair with respect to the conveying direction and configured to convey the sheet, said third roller pair conveying the sheet at a fourth speed lower than the third speed.

3. An image forming system according to claim 2, wherein the third speed is higher than the first speed.

4. An image forming system according to claim 2, wherein the third speed is lower than the first speed.

5. An image forming system according to claim 2, further comprising a first curved guide member arranged on at least one of said image reading apparatus and said sheet discharging apparatus and configured to slidably guide a trailing edge of the sheet toward said third roller pair between said fourth roller pair and said third roller pair with respect to the conveying direction.

6. An image forming system according to claim 2, wherein said image reading unit comprises:
    a fifth roller pair arranged between said second roller pair and said fourth roller pair with respect to the conveying direction;
    a first image reading portion arranged between said second roller pair and said fifth roller pair with respect to the conveying direction and configured to read a first surface of the sheet; and
    a second image reading portion arranged between said fifth roller pair and said fourth roller pair with respect to the conveying direction and configured to read a second surface opposite to the first surface of the sheet.

7. An image forming system according to claim 2, wherein said image forming apparatus further comprises a first motor configured to drive said first roller pair so that a conveying speed of the sheet conveyed by said first roller pair becomes the first speed,
    wherein said image reading apparatus further comprises a second motor configured to drive said second roller pair and said fourth roller pair so that a conveying speed of the sheet conveyed by said second roller pair becomes the second speed and a conveying speed of the sheet conveyed by said fourth roller pair becomes the fourth speed, and
    wherein said sheet discharging apparatus comprises a third motor configured to drive said third roller pair so that a conveying speed of the sheet conveyed by said third roller pair becomes the third speed.

8. An image forming system according to claim 1, wherein said image forming apparatus further comprises a first motor configured to drive said first roller pair so that a conveying speed of the sheet conveyed by said first roller pair becomes the first speed, and
    wherein said image reading apparatus further comprises a second motor configured to drive said second roller pair so that a conveying speed of the sheet conveyed by said second roller pair becomes the second speed.

9. An image forming system according to claim 1, wherein said first roller pair and said second roller pair are configured to form a loop of the sheet between said first roller pair and said second roller pair with respect to the conveying direction.

10. An image forming system according to claim 9, further comprising (a) a second guide member arranged on said image forming apparatus and configured to guide the sheet and (b) a third guide member arranged on said image reading apparatus and configured to guide the sheet,
    wherein both second and third guide members define a space to form the loop.

* * * * *